June 19, 1962 W. F. THORNBURGH 3,039,254
AIR CLEANER AND SILENCER ASSEMBLY
Filed Aug. 8, 1958 3 Sheets-Sheet 1
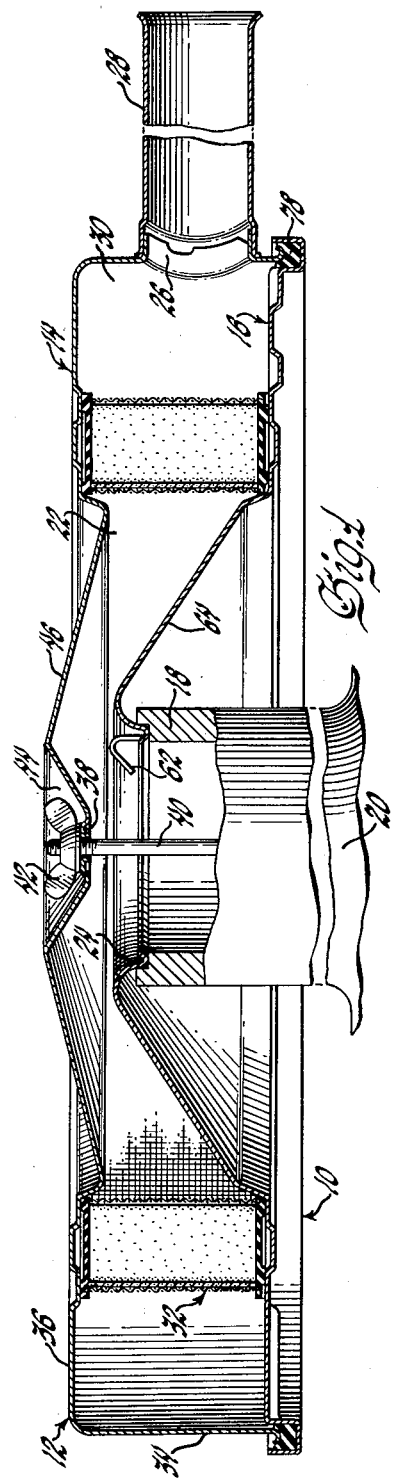
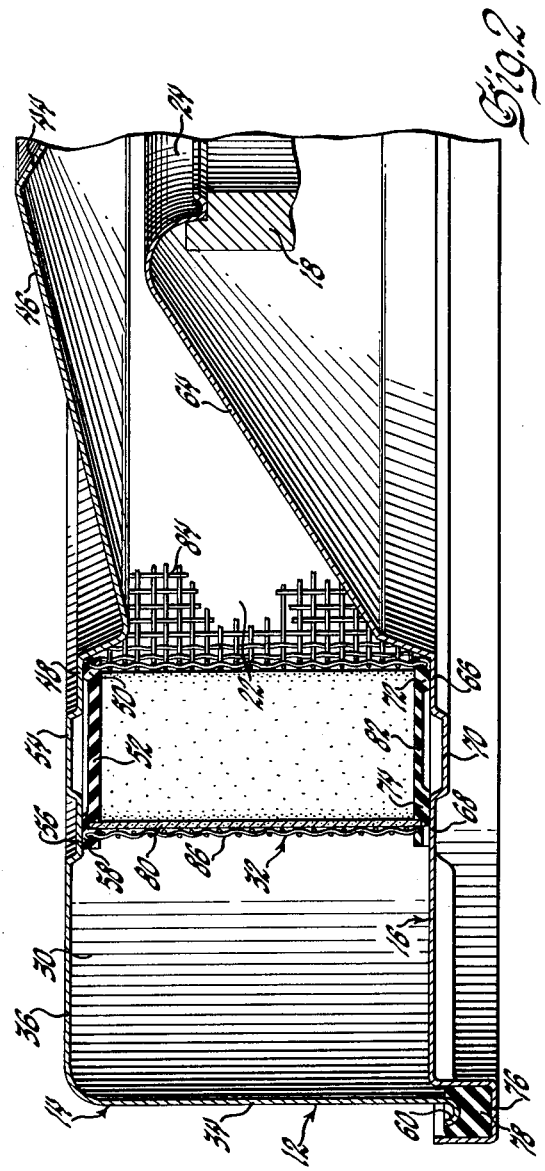
INVENTOR.
William F. Thornburgh
BY
D. D. McGraw
ATTORNEY June 19, 1962 W. F. THORNBURGH 3,039,254
AIR CLEANER AND SILENCER ASSEMBLY
Filed Aug. 8, 1958 3 Sheets-Sheet 2

INVENTOR.
William F. Thornburgh
BY
D. D. McGraw
ATTORNEY

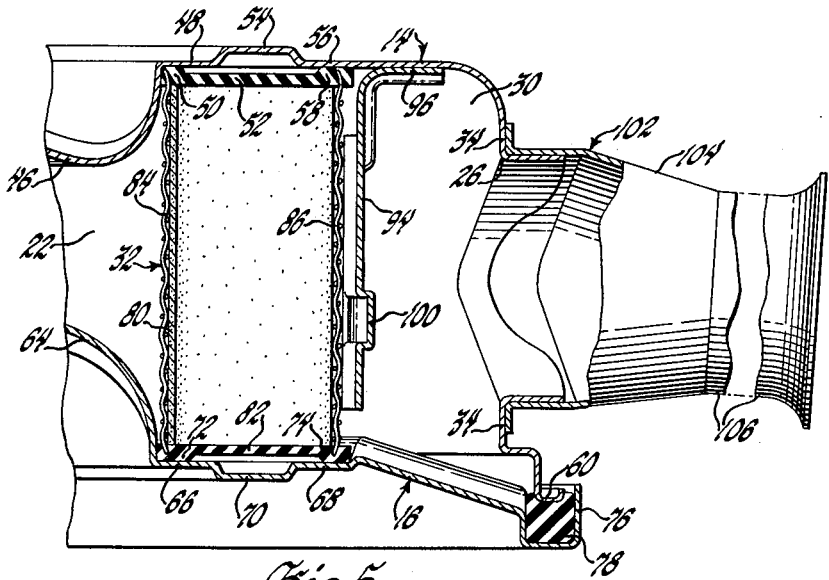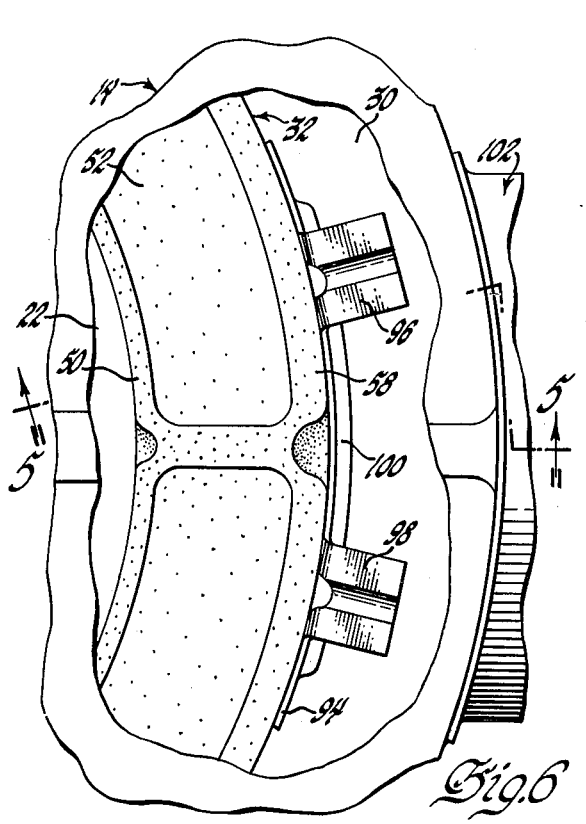

United States Patent Office 3,039,254
Patented June 19, 1962

3,039,254
AIR CLEANER AND SILENCER ASSEMBLY
William F. Thornburgh, Flint, Mich., assignor to General Motors Corporation, Detroit, Mich., a corporation of Delaware
Filed Aug. 8, 1958, Ser. No. 754,052
2 Claims. (Cl. 55—276)

The invention relates to an air cleaner and silencer assembly and more particularly to such an assembly which may be employed to clean the air entering the induction system of an internal combustion engine and to silence noises emanating from such engines through the air induction system. It is proposed that an air cleaner and silencer assembly be provided which will occupy a minimum amount of vertical space while effectively cleaning the air entering the engine and silencing the sounds emanating from the engine through the induction system. It is proposed that such an assembly be simple in design and inexpensive to manufacture as well as permitting easy assembly and disassembly.

The casing is formed as a two-piece assembly to provide air distribution and acoustical expansion chamber means including an air inlet and supply chamber and inner air distribution and acoustical capacitance chamber. These chambers are capable of supplying the full requirements of air to the engine induction system inlet means. The air inlet chamber is formed to provide air inlet passage means which also acts as a tuning tube. Air cleaner means may be mounted within the interior of the casing to separate the air inlet chamber and the inner air distribution and acoustical capacitance chamber. The air entering the engine induction system inlet means passes through the air inlet passage means and into the air inlet chamber, through the air cleaner means and into the inner air distribution and acoustical capacitance chamber, after which it passes out of the assembly through appropriately provided air outlet and acoustical inlet means connected with the engine induction system inlet means. The tuning tube and the inlet chamber of the air cleaning means are tuned to the capacitance of the inner air distribution and acoustical capacitance chamber for attenuating sounds emanating from the induction system of the engine. The assembly is so constructed and arranged as to receive the engine induction system inlet means within the assembly periphery so that the bulk of the assembly is positioned below the upper end of the induction system inlet means. The assembly is secured to the engine induction system inlet means by any suitable fastening means which may be released to permit easy removal of the assembly upper wall after which the air cleaner means may be readily removed and replaced as desired.

In the drawings:

FIGURE 1 is a vertical elevation view taken in the direction of arrows 1—1 of FIGURE 3. The view is taken in vertical section and has parts broken away.

FIGURE 2 is a fragmentary enlarged view of a portion of FIGURE 1.

FIGURE 5 is a view of another modification of the assembly of FIGURE 1 and illustrates a fragment of the modified assembly with parts broken away and in section. The view is taken in the direction of arrows 5—5 of FIGURE 6.

FIGURE 6 is a fragmentary plan view of the modified assembly of FIGURE 5 with parts broken away and in section; and FIGURE 7 is a fragmentary view of another modification of the assembly embodying the invention and is presented as a vertical section with parts broken away.

Figure 3:
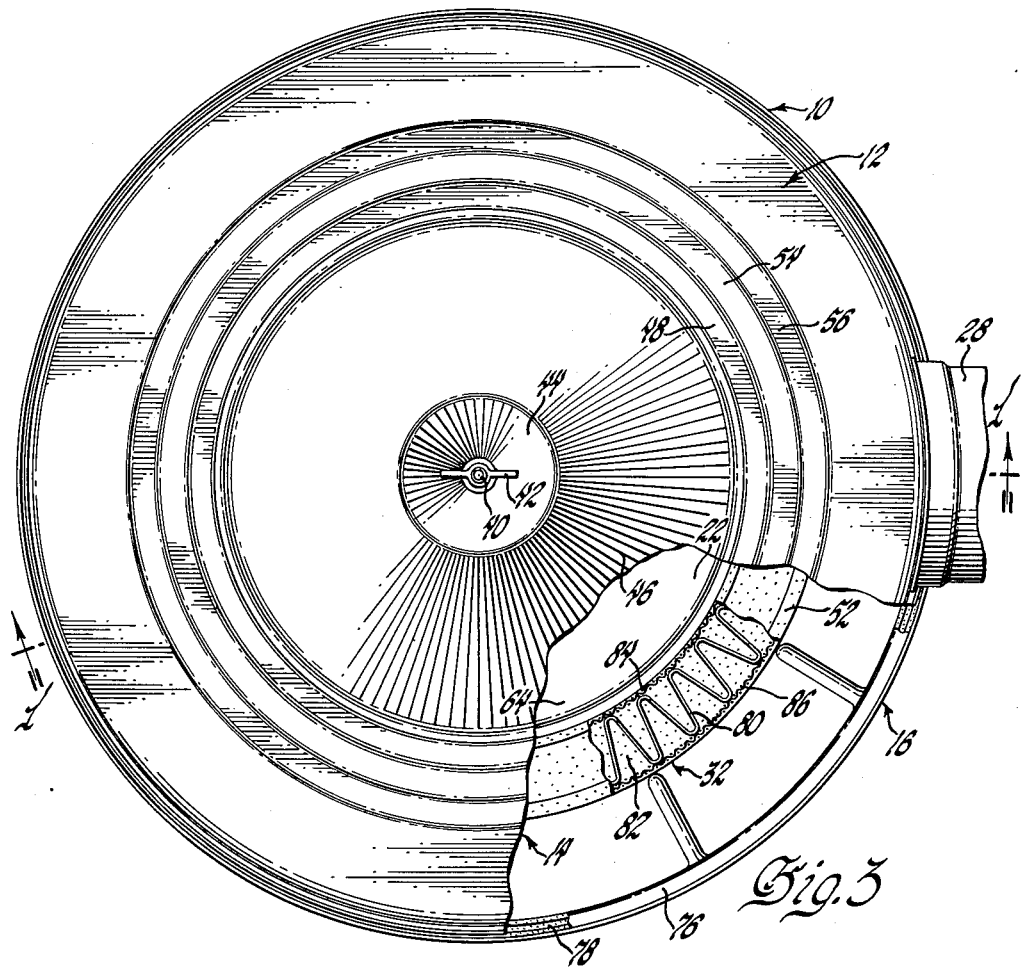
FIGURE 3 is a plan view of the assembly of FIGURE 1 with parts broken away and in section.

The assembly 10 embodying the invention comprises a shallow annular casing 12 having an upper wall 14 and a lower wall 16 adapted to extend over and around the air induction inlet means 18 of an internal combustion engine 20. In the present instance the induction inlet means is illustrated as having a single carburetor air intake or other inlet means. The upper wall 14 and the lower wall 16 form the casing 12 to provide the inner air distribution and acoustical capacitance chamber indicated at 22. The chamber 22 is adapted to communicate with the inlet means 18 through flanged opening 24 formed centrally in the lower wall 16. The opening 24 and the induction inlet means 18 provide air outlet and acoustical inlet passage means communicating with the chamber 22. The casing 12 is also provided with an inlet port 26 at one side of the casing which opens outwardly through a section of the upper wall 14. Air inlet passage means 28 is connected to inlet port 26 to provide a tuning or acoustical impedance tube extending outwardly from wall 14 and connected with the air inlet chamber 30 which is defined by the outer portions of upper wall 14 and lower wall 16. Chambers 22 and 30 cooperate to provide air distribution and acoustical expansion chamber means. Tube 28 is illustrated in FIGURE 1 as having a constant area cross section throughout its length. It may be oval, ellipsoidal or circular in cross section. It is preferable to form it ovally or ellipsoidally to keep the vertical diameter to a minimum while providing sufficient flow area. Air cleaner means 32 is received between upper wall 14 and lower wall 16 and is preferably annular in formation so as to extend circumferentially about the flanged opening 24 and divide the chamber means of casing 12 into the two chambers 22 and 30.

The upper wall 14 is formed from one piece of material to provide a circumferentially extending wall portion 34 and a generally disc shaped wall portion 36. The wall portion 36 is provided with a bolt receiving boss 38 formed centrally of the wall 14 through which the retaining bolt 40 is extended. A wing nut 42 may be threaded on bolt 40 and tightened to hold the upper wall 14 against the air cleaning means 32 and in engagement with the lower wall 16. The bolt and nut will also hold the entire assembly in place on the induction inlet means 18 since the bolt is secured therein. A frusto-conical section 44 provides a depression in the upper surface of wall 14 in which wing nut 42 is received so that a minimum vertical extension of the assembly is maintained. A second frusto-conical section 46 is formed concentrically of section 44 and slopes downwardly therefrom to define the upper boundary of chamber 22. While this section is illustrated as being straight in cross section, it may be provided with reinforcing ridges or grooves as desired and may have a curved conformation in order to accommodate any particular installation. The upper wall 14 is provided with a flat annular seat 48 radially outwardly of section 46 on which the inner land 50 of the gasket-like plastic upper end 52 of air cleaning means 32 may be engaged. An annular groove 54 is then provided radially outwardly of seat 48 and a second annular seat 56 is formed radially outwardly of groove 54. The outer land 58 of end 52 is engaged with seat 56 to seal the end of the cleaning means to the upper wall 14. Separate inner and outer seats 48 and 56 are provided in order to assure a flat seating surface for use in conjunction with the lands 50 and 58. The annular portion of upper wall 14 formed outwardly of the seat 56 extends to the wall portion 34 of the casing 12 and is integrally formed therewith. The inlet port 26 is formed in wall portion 34 and an annular shoulder or flange 60 is provided at the outer edge of wall portion 34 in order that the upper wall 14 may be sealed to the lower wall in a manner to be described.

The lower wall 16 has the flanged opening 24 centrally formed therein to provide the air outlet and acoustical inlet means cooperating with the engine induction system inlet means 18. A location tab 62 may be formed as a part of opening 24 if desired. This tab may be engageable with a suitable portion of the induction inlet means not shown in order to assure proper location of the assembly 10 relative to the engine 20. A frusto-conical section 64 is formed as a part of lower wall 16 with its upper end integrally connected with flanged opening 24. Section 64 slopes downwardly underneath section 46 of upper wall 14 but with a greater slope so that the thickness of the cross section of the chamber 22 as viewed in FIG. 1 increases with the radius of that chamber. This provides a gull-wing conformation of chamber 22 as seen in FIGURE 1 with inner terminal ends at the air outlet acoustical inlet 24 and outer terminal ends at air cleaning means 32. The lower wall 16 has annular seats 66 and 68 formed therein and spaced apart by annular groove 70 to provide the seats for the lower inner and outer lands 72 and 74 respectively of the air cleaning means 32. These lands and seats cooperate to seal the lower portion of the cleaning means to the assembly lower wall.

The portion of lower wall 16 outward from seat 68 provides the lower boundary of chamber means 30. The outer periphery of lower wall 16 is flanged as indicated at 76 to receive a sealing gasket 78. This gasket is engaged by the annular flange 60 of upper wall 14 to seal the chamber 30 from the atmosphere at this point. A metal-to-metal contact may be used between the upper wall 14 and the lower wall 16 in place of gasket 78 by arranging the conformation of the upper wall relative to the lower wall so that such engagement will take place prior to the sealing engagement of the air cleaner means with the walls, the upper wall being sufficiently flexible to permit the annular seats 48 and 56 to then engage the air cleaner means and provide the desired seal. This may be readily accomplished when the wing nut 42 is tightened on the bolt 40.

The particular air cleaner means shown in FIGURES 1–3, 5, and 6 are of the pleated paper filter element type in which the paper filtering element 80 is folded as best seen in FIGURE 3 to provide a circumferentially extending series of pleats. The upper and lower ends of element 80 are imbedded in the plastic ends 52 and 82 and are held in properly spaced relation by the inner screen 84 and the outer screen 86. These screens also provide vertical stiffness for the filter unit and act as load bearing members when the filter unit is installed. This element is designed to be replaced when dirty rather than being cleaned and reused. In order to replace the element, it is desirable to provide the assembly with an easily assembled and disassembled cover. Upper wall 14 provides such a cover. The only attaching means which must be manipulated during assembly and disassembly of the unit is that comprising wing nut 42 and the retaining bolt 40. When the nut 42 is removed, the entire upper wall 14 may be lifted off lower wall 16 and the air cleaning means is then readily accessible for removal and replacement.

Figure 4:
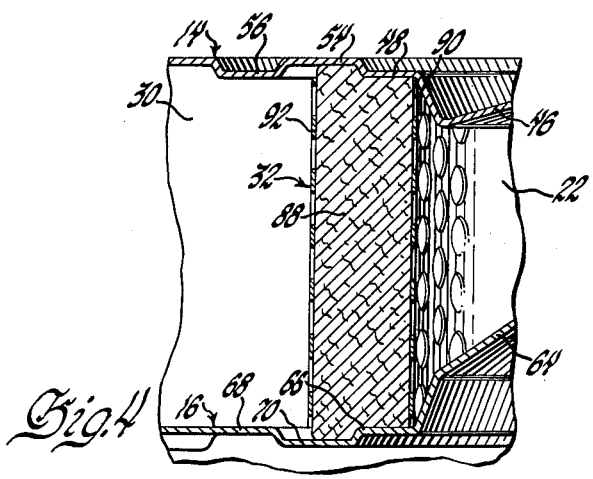
FIGURE 4 is a fragmentary view similar to the view illustrated in FIGURE 2 and showing a modified assembly having parts broken away and in section.

The modified air cleaning means shown in FIGURE 4 includes a compressed aluminum ribbon filter element 88 which is of the oil wetted type and may be cleaned and reused if desired. Since the element 88 is compressed, it may be formed to occupy a smaller radial space than that of the paper element type air cleaner. It may also be formed with inner and outer screens 90 and 92 of any suitable type such as the perforated sheets shown, expanded metal or woven screens. Since the aluminum ribbon filter element 88 is compressible, no sealing gasket need be provided at either end to seal the element at the points of contact with the upper and lower walls.

The modified assembly illustrated in FIGURES 5 and 6 differs from the assembly of FIGURES 1–3 in that a baffle wall 94 is provided in front of the tuning tube 102. Baffle 94 shields the air cleaning means 32 from the incoming air to prevent dirt from piling up on that part of the cleaning means directly exposed to the air leaving the intake passage formed by the tuning tube. The baffle 94 extends arcuately about the air cleaning means 32 for the width of the inlet port 26. Its lower edge terminates sufficiently above lower wall 16 to permit incoming air to have access to the portion of the cleaning means immediately adjacent the baffle. The air entering chamber means 30 through a port 26 is directed by baffle 94 to either side and downwardly so that the air cleaning means 32 will be employed throughout its effective circumference and will not become loaded with dirt at one impact point.

The baffle wall 94 may secured by mounting tabs 96 and 98 to the lower surface of upper wall 14 which forms the upper boundary of chamber 30. These tabs may be integrally formed with the baffle and bent to permit their attachment to upper wall 14 by any suitable means. Baffle 94 thus extends across the entire cross section area of the port 26 subtended on the air cleaner means. The baffle wall 94 may be provided with one or more reinforcing grooves 100 if desired.

The tuning tube 102 which forms the air inlet passage connected with inlet port 26 is also a modification of the tube of FIGURE 1. Tube 102 has a slightly tapered or flared inner end 104 and a straight section 106 forming the outwardly extending portion of the tube. Due to the relatively large air flow passing through tube 102, it is advantageous to provide for gradual expansion of the air entering chamber 30 to prevent undue shock losses. The tapered inner end 104 flares outwardly in the direction of air flow to permit the desired gradual expansion. Tube 102, chambers 30 and the air cleaning means 32 are tuned to the capacitance of the inner air distribution and acoustical expansion chamber 22 for attenuating sounds discharged through the induction system of the engine.

The modified assembly illustrated in FIGURE 7 employs the baffle wall 94 and the aluminum ribbon filter element 88. This filter element is assembled intermediate the upper wall 14 and the lower wall 16 in a manner similar to the assembly of the element as illustrated in FIGURE 4. The baffle wall 94 acts as a deflector for this element in the same manner as that described relative to the structure shown in FIGURES 5 and 6.

Air cleaner and silencer assemblies embodying the invention permit a substantial reduction in the vertical height of such assemblies as compared to assemblies previously known. This is accomplished without compromising the filter area of the assemblies and continues to permit the maximum required volume of intake air to be delivered to an internal combustion engine through its induction system. Such assemblies also effectively silence sounds emanating from the engine induction systems. They are relatively easy to manufacture and considerably less expensive to do so since their casings are each formed of two pieces which may be readily assembled and disassembled.

What is claimed is:

1. An air cleaner and silencer assembly for internal combustion engines and comprising, a casing formed by an upper wall and a lower wall, said upper wall having an outer annular section terminating in a side wall and an inner upwardly extending frusto conical section, said lower wall having an outer annular section and an inner upwardly extending frusto conical section of greater slope than said upper frusto conical section, said outer annular section being formed to provide a peripheral channel about said lower wall, air outlet and acoustical inlet passage means formed centrally of said lower frusto conical section and communicating with the space between said frusto conical sections, a gasket disposed in said peripheral channel in said lower wall and between said side wall and the outer edge of said lower wall, said upper and lower walls within said side wall being spaced to provide air distribution and acoustical capacitance chamber means within said casing, air inlet and acoustical outlet passage means formed in said side wall and communicating with said chamber means, annular air cleaner means within said casing and secured between said outer annular wall sections and dividing said chamber means into outer air inlet and acoustical outlet chamber means communicating with said air inlet and acoustical outlet passage means and into air outlet and acoustical inlet chamber means communicating with said air outlet and acoustical inlet passage means, means removably securing said upper wall and said lower wall together on said gasket and said cleaner means with said air outlet and acoustical inlet passage means engaging and communicating with the induction system of an internal combustion engine, said air inlet and acoustical outlet passage means and said chamber means being tuned to attenuate sounds emanating from said engine.

2. An air cleaner and silencer assembly as defined by claim 1 and in which baffle means extends downwardly from said upper wall in a position directly opposite said air inlet and acoustical outlet passage means for deflecting dirt entering said casing from the part of said air cleaner means opposite said air inlet and acoustical outlet passage means.

References Cited in the file of this patent

UNITED STATES PATENTS

| | | |
|---|---|---|
| 2,359,386 | Reinsch | Oct. 3, 1944 |
| 2,632,526 | Brock et al. | Mar. 24, 1953 |
| 2,720,279 | James | Oct. 11, 1955 |
| 2,782,933 | Monsarrat | Feb. 26, 1957 |
| 2,789,662 | McMullen | Apr. 23, 1957 |
| 2,865,467 | McMichael | Dec. 23, 1958 |

FOREIGN PATENTS

| | | |
|---|---|---|
| 943,085 | Germany | May 9, 1956 |